(12) United States Patent
Taylor et al.

(10) Patent No.: US 7,045,172 B2
(45) Date of Patent: May 16, 2006

(54) METHOD OF SHIELDING EFFLUENTS IN SPRAY DEVICES

(75) Inventors: Thomas A. Taylor, Indianapolis, IN (US); John E. Jackson, Brownsburg, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 140 days.

(21) Appl. No.: 10/631,260

(22) Filed: Jul. 31, 2003

(65) Prior Publication Data

US 2005/0048217 A1 Mar. 3, 2005

(51) Int. Cl.
*C23C 4/06* (2006.01)
*C23C 4/10* (2006.01)
*C23C 4/12* (2006.01)

(52) U.S. Cl. ............... 427/454; 427/446; 427/452; 427/453; 427/456; 239/1; 239/79

(58) Field of Classification Search ............ 427/446, 427/452, 453, 454, 456; 239/79, 1
See application file for complete search history.

(56) References Cited

U.S. PATENT DOCUMENTS

| 3,470,347 | A |   | 9/1969  | Jackson .................. 219/76       |
| 4,964,568 | A | * | 10/1990 | Rotolico et al. ............. 239/8     |
| 5,073,433 | A | * | 12/1991 | Taylor ..................... 428/134     |
| 5,486,383 | A | * | 1/1996  | Nowotarski et al. ........ 427/446      |

* cited by examiner

*Primary Examiner*—Katherine Bareford
(74) *Attorney, Agent, or Firm*—Gerald L. Coon

(57) ABSTRACT

This invention provides a unique gas shield or shroud surrounding the effluent of a thermal spray device that effectively can extend the working distance or standoff between the thermal spray device and the surface being coated. This invention provides a method of spraying materials, including ceramic materials and reactive materials, at a long standoff and a method of controlling the temperature of the effluent being deposited using heated gas shield.

30 Claims, 4 Drawing Sheets

24-Hole Ring

45-Hole Ring

45-Hole Ring

METHOD OF SHIELDING EFFLUENTS IN SPRAY DEVICES

FIELD OF THE INVENTION

This invention relates generally to the field of thermal spray and the shielding of the thermal spray effluent by a shielding gas that is heated so that the effluent spraying can be performed at an extended standoff and/or provide a combustible shielding gas to effectively encase the effluent to extend the standoff.

BACKGROUND OF THE INVENTION

In thermal spray deposition, material in powder, wire, or rod form is heated to near its melting point or just above and the molten or nearly molten particles accelerated in a gas stream to a high velocity before impacting on the surface to be coated, the substrate. On impact the particles flow into thin laminar splats and rapidly freeze and cool. The coating is made up of many layers of splats. Metallic, ceramic, cermet, and some polymeric materials may be deposited using thermal spray devices. A variety of thermal spray devices would include plasma, detonation gun, high velocity oxy-fuel, wire arc, and flame spray. The coatings are usually produced by moving the thermal spray device relative to the part being coated to distribute the material uniformly over the surface in multiple passes. This helps to control the temperature of the surface being coated and the residual stress in the coating.

In plasma spray deposition a gas, usually based on argon, nitrogen, hydrogen, and/or helium, is ionized by an electric arc as it flows through a nozzle in a plasma spray torch forming a high temperature, high velocity partially ionized plasma effluent. Coating material, usually in powder form, is injected into the plasma effluent and heated to near or just above its melting point and the molten or nearly molten particles accelerated in a gas stream to a high velocity before impacting on the surface to be coated, the substrate. On impact the particles flow into thin laminar splats and rapidly freeze and cool. The coating is made up of many layers of splats. Metallic, ceramic, cermet, and some polymeric materials may be deposited. The coatings are usually produced by moving the plasma spray device relative to the part being coated to distribute the material uniformly over the surface in multiple passes. This helps to control the temperature of the surface being coated and the residual stress in the coating.

The most important parameters that determine the microstructure and properties of the coatings include the temperature of the particles, their velocity, the extent to which they have reacted with the environment during deposition, the rate of deposition, the angle of impact, and the temperature of the substrate and previously deposited coating. The particles are heated (with the exception of the wire arc process) and accelerated by the gaseous effluent of the thermal spray device thus the temperature and velocity achieved are a function, in part, of the dwell time in the effluent. For plasma spray, the particles are heated and accelerated by the gaseous effluent and thus the temperature and velocity achieved are a function, in part, the dwell time in the effluent. The dwell time, in turn, is defined by the velocity of the particles and the distance (called the standoff) between the exit of the thermal spray device and the substrate. The temperature and velocity of the effluent of the thermal spray device decrease fairly rapidly on exit from the device. Therefore, there is an optimum standoff that allows sufficient distance or time for the particles to be heated and accelerated, but not so great that the effluent and particle temperatures and velocities begin to decline significantly. The angle of impact can have a major influence on the microstructure and properties of the coating. Generally, the optimum angle is at 90 degrees or normal to the substrate. As the angle becomes lower, the microstructure becomes more turbulent and less dense. The rate at which this degradation occurs is a function, in part, of the velocity and temperature of the particles on impact. The effective standoff and the sensitivity to the angle of deposition are particularly important when thermal spraying components with a complex shape. Thermal spray and plasma spray are inherently a line of sight process, and the size of the spray device and shape of the part being coated may limit how close the spray device can be brought to the part and still maintain an allowable angle of deposition. Thus it may not be possible to bring the device close enough to the surface to deposit the particles at a sufficient temperature, velocity, and angle of impact to produce a coating with a suitable microstructure.

The residual stress in coatings is a further property that must be controlled for optimum results. In most cases low residual stress is desired, but in one case the in-plane tensile stress is controllably managed to produce long vertical through-thickness segmentation cracks (Taylor, U.S. Pat. No. 5,073,433). Residual stress arises from a combination of factors. One is the shrinkage of the coating material being deposited as it cools from the solidification temperature. Other factors can include a peening-like mechanism as particles impact the coating and temperature cycling of the coating and substrate as the thermal spray device moves over the part in its traverse. Another source of coating stress is related to the rate and extent of heat absorption and dissipation during coating. These are controlled by various means including the level of pre-heat given the substrate before coating commences and the amount of auxiliary cooling used during coating. Accomplishing and controlling preheating can be very difficult, particularly when coating large or complex shapes. Yet another major source of coating stress is the thickness of the layer put down as the thermal spray device traverses over the substrate. The factors controlling this layer thickness are many, and include the spray rate (grams powder sprayed per unit time), the standoff, and the sweep rate of the torch over the substrate. If the spray rate is held high for higher production rates, and the standoff is essentially fixed due to the issues discussed above, most of the burden of controlling the stress in the coating falls upon the manipulation of the relative sweep rate of the torch over the substrate, also known as the surface speed. To reduce stress, the surface speed is increased, and could approach high speeds such as 10,000 inches per minute. It may be possible to obtain these speeds for coating simple shapes, but not for complex shapes such as turbine blades that require robotic machines that can only achieve surface speeds on the order of 1000 inches per minute to optimize standoff and angle of deposition during coating. If the standoff could be increased and the desired coating properties still maintained, the surface speed could be reduced commensurately.

The effluent of a thermal spray device, i.e., plasma spray torch begins to mix with the surrounding environmental gases, usually air, immediately upon exiting the thermal spray device. If a reactive material is being deposited, such as most metals, polymeric materials, and, to a lesser extent, carbides and nitrides, the oxygen from the air being mixed with the effluent can oxidize the material, significantly changing the properties of the coating. Generally, the longer the standoff, the greater the degree of oxidation. There are two major methods of avoiding this oxidation. One is to deposit the coating in a vacuum chamber under a low pressure of inert gas. In this situation the inert gas, usually argon, is drawn into the effluent rather than air, and no oxidation occurs. This technique has been well developed for plasma spray deposition and can be very effective. It has an additional benefit of a longer standoff due to the low pressure environment. The capital and operating costs of such a system are very high, however, and the production rate is low. The alternative is to provide a coaxial inert gas shield or shroud surrounding the effluent. In this manner inert gas is drawn into the effluent of the thermal spray device, and oxidation of the coating material is prevented.

An effective gas shield is that invented by Jackson, U.S. Pat. No. 3,470,347. This invention provides a uniform flow of turbulent inert gas, usually argon, surrounding the effluent of a plasma spray torch. It is very effective in preventing oxidation of reactive materials during deposition, but it has a limited standoff capability. Thus, when coating parts with a complex shape such as one with deep fillets or protuberances, it may not be possible to keep the thermal spray device close enough to the surface to maintain effective shielding.

Another invention provides a laminar gas shield by introducing a flow of inert gas normal to the thermal spray effluent within the thermal spray nozzle or an attachment to the thermal spray device through a porous medium arrayed parallel to the effluent such that the interaction of the inert gas to the flow of the effluent will prevent infiltration of gas and/or vapor from the surrounding environment (M. S. Nowotarski, et al, U.S. Pat. No. 5,486,383).

One the many important fields of application for thermal spray coatings is that of thermal barriers on many of the components of gas turbine engines. Modern gas turbine engines for aircraft propulsion and for ground-based electrical power generation continue to push to higher operating temperatures, because overall efficiency improves with higher temperature Some gas turbines operate at such high temperatures that the directly heated metallic components, such as combustors, blades and vanes would have very short life if not given a protective ceramic coating. The ceramic coating, known as a thermal barrier coating (TBC), is an insulator and acts to reduce the substrate temperature.

There are many variations of thermal barrier coatings, based on the materials selected for the coating and the coating processes. Most TBCs include a metallic bondcoat applied to the metallic substrate component and, on top of the bondcoat, a ceramic layer, usually based on zirconium oxide because of its very low thermal conductivity. The zirconia layer of the coating varies depending on the specific requirements; e.g., from about 0.25 mm (10 mils) on some turbine blades and vanes to over 2.5 mm (100 mils) or more on combustors. The coating can reduce the substrate temperature by 200 or more degrees Fahrenheit (111 degrees Centigrade), depending on the hot and cold side boundary conditions. On blades and vanes, the TBC must protect the airfoil and usually the attachment platform or end walls. On combustors, the TBC is applied on the interior surfaces. The metallic bondcoat can be applied by various methods including thermal spray methods (e.g., shrouded and air-plasma torch, vacuum chamber plasma torch, detonation gun, or high velocity oxy-fuel gun), gas diffusion (such as pack aluminizing), and advanced methods of electroplating. The zirconia ceramic layer can be applied using various methods including thermal spray and electron beam physical vapor deposition (EB-PVD).

In the application of thermal spray coatings on complex shapes, such as turbine blades or vanes, there are several issues that affect the quality of the coating or sometimes even the possibility of applying the coating. Standoff is one such issue because it affects the microstructure of the coating including its porosity and microcracking. Controlled porosity and microcracking are essential to the thermal shock and thermal fatigue resistance of the oxide layer in a TBC. The shape of the part including protuberances (such as the vane platform edges) sets the minimum standoff that can be achieved, which may be too long for the desired microstructure to be achieved using the current state of the art thermal spray devices and shields.

Most TBC metallic bond coats contain one or more very reactive elements such as aluminum or yttrium and, to provide adequate corrosion resistance in service, must be deposited in such a manner that these elements are not oxidized during the deposition process (internal oxidation). As noted, co-axial inert gas shields (e.g., Jackson, U.S. Pat. No. 3,470,347) are a very effective means of accomplishing this. This approach is a much more convenient and a lower cost method of coating reactive metal coatings, such as NiCoCrAlY, than is vacuum or low pressure plasma spray. It is effective, however, for only relative short standoffs, and therefore may not be very effective for some complex parts such as some turbine blades and vanes.

In summary, thermal spray methods are known to those skilled in the art for the deposition of reactive materials such as most metals without significant degradation due to oxidation during deposition. However, these techniques involve either very expensive deposition in vacuum chambers or the use of inert gas shields with limited standoff effectiveness. Moreover, thermal spray methods of deposition of ceramic coatings with desired microstructures are known, but also have limited standoff capabilities. It is also difficult to adequately control the amount and rate of substrate and coating heat absorption and dissipation during coating, particularly when coating large or complex shapes.

It is an object of this invention to provide a novel gas shield or shroud surrounding the effluent of a thermal spray device.

It is a further object of this invention to extend the effective working distance or standoff between the thermal spray device and the surface being coated through the use of said unique gas shield.

Another object of this invention is to provide a method of thermal spraying reactive materials using a unique dual gas shield consisting of an inner inert gas shield and an outer gas shield.

It is a further object of the invention to provide coated articles using the methods of this invention.

It is a further object of this invention to provide a unique gas shield or shroud comprising a combustion flame and combustion products surrounding the effluent of a thermal spray device such as a plasma spray device.

SUMMARY OF THE INVENTION

One embodiment of the invention provides a novel method of shielding the effluent of a thermal spray device comprising the heating of an annular source of shield gas to a temperature above ambient and said shield gas flow being substantially surrounding said effluent in an coaxial manner and the annular source for said sheild gas is in a plane normal to said effluent thereby providing said gas flow parallel to the effluent. Preferably the temperature of said shield gas is heated to at least 500° F. measured on the centerline of the flow conic at 13 inches downstream from the source of said shield flow. Preferably, the shield gas is a flow having at least a laminar segment from the source of said effluent flow. Another embodiment of the invention provides a novel gas shield comprising a combustion flame surrounding the effluent of a thermal spray device. The invention provides a method of spraying materials, including nonreactive and reactive materials, at a long standoff and a method of controlling the temperature of the substrate being coating using said gas shield device. The invention also provides a method of spraying reactive materials using a dual gas shield consisting of an inner inert gas shield and an outer gas shield. The method of this invention can be used to coat parts or components for gas turbines, diesel engines and rocket engines. Preferably, the coatings produced by the methods of this invention could have a porosity between about 5% and about 40%.

As used herein, effluent shall mean the delivery gas and the coating material of the desired layer to be deposited on the substrate.

DESCRIPTION OF THE PREFERRED EMBODIMENTS

Figure 1:
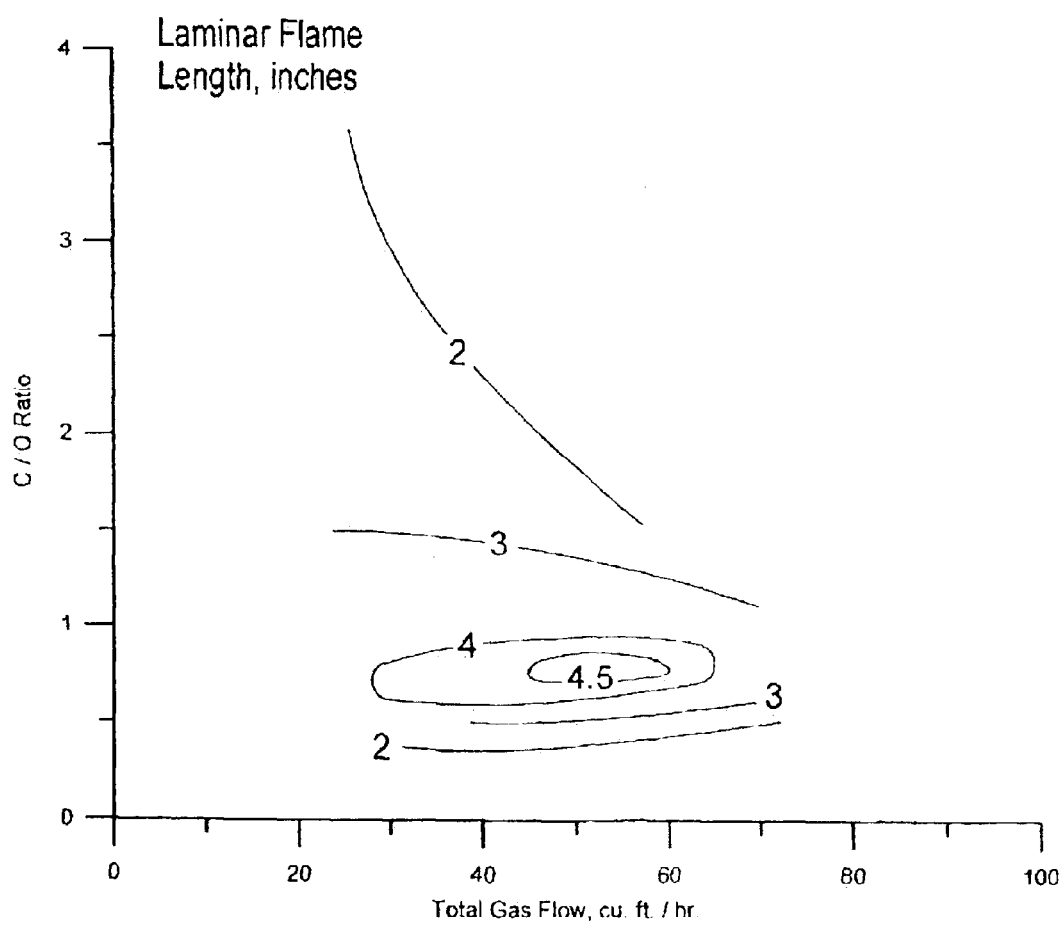
FIG. 1 is a plot of laminar flame length as a function of total gas flow (propylene+oxygen) and the oxygen to carbon ratio of the gas mixture (O/C ratio) for a 24-hole demonstration flame ring of this invention.

It has been discovered that by changing from the known turbulent inert gas shields to shields having at least an initial length of flow that is essentially laminar, the amount of mixing between the shield gas and the surrounding air (or other gaseous environment), as well as between the shield gas and the thermal spray effluent, is substantially reduced.

Another embodiment of this invention is a novel gas shield for thermal spraying that comprises a ring or sheath of combustion flames and combustion products that surrounds the effluent of the thermal spray device. This combustion flame shield substantially increases the useful range of standoff distances that can be employed in producing desired coatings. It is believed that this is accomplished, in part, because the amount of mixing between the shield gas and the surrounding air (or other gaseous environment), as well as between the shield gas and the thermal spray effluent is substantially reduced for much longer distances than with the state of the art shields. Examples of the coated layers produced by the method of the invention are NiCoCrAlY, NiCrAlY, CoCrAlY, FeCrAlY, zirconia-based ceramics and other ceramics.

These embodiments decrease the rates at which the temperature and velocity of the spray effluent decrease with distance from the exit of the spray device. There are potentially several benefits that result from this. One of these benefits is that the standoff can be increased without diminishing the properties of the coating. A longer standoff allows more complex shapes to be coated, reduces the sensitivity of the coating to the angle of deposition, facilitates control of residual stress, allows more time to heat the powder particles, and may have other beneficial effects.

One embodiment of this invention is to produce more laminar shield gas flows by increasing the viscosity of the shield gas. It is known that most normal gases, including those frequently used for shielding such as argon or nitrogen, have essentially the same viscosity at room temperature. Substantial increase in gas viscosity, however, can be obtained by heating the gas. Data in the literature (Y. Chyou, *Modeling of Thermal Plasma Systems*, Ph.D. Thesis, U. Minnesota, June 1987, Appendix H) shows that the kinematic viscosity (defined as the gas viscosity divided by its density) of argon and air increases by a factor of ten on heating from room temperature to 2000° F.

The transition between laminar flow and turbulent flow of gases in pipes has been previously studied, and correlated to a flow parameter called the Reynolds number. The Reynolds number is defined as:

$$R_e = \frac{(\text{gas velocity}) \times (\text{pipe inside diameter})}{\text{kinematic viscosity of gas}}$$

It combines the gas properties and the geometrical aspect of the pipe the gas is flowing through. Experimentally, laminar flow is found for flow in pipes for Reynolds numbers less than about 2300. The interest here is in flow in air after the gas has exited such a pipe.

A method was developed to visualize gas flows and determine the effect of viscosity and flow rate on laminar flow after the gas exits a pipe or nozzle based on the differences in refractive index of heated and ambient temperature gas. This method utilizes a Schlieren camera and is described in detail in Example 1 below. Using this method and air preheated to temperatures from 220° to 1050° F. as the shield gas, it was discovered that if laminar flow can be established in a pipe, the gas flow remains laminar for some distance after exiting the pipe. It was found that laminar flows of measurable length outside the nozzle exits were developed for Reynolds numbers less than 5000 and that the length of the laminar flow increased as the Reynolds number decreased below 5000. It was also found that laminar flow can best be established if a length of the section of the pipe or nozzle immediately preceding the exit is straight. The length of the straight section required for laminar flow for a given distance past the exit of the pipe or nozzle is a function of several properties of the gas.

Although air was used in the experiments in Example 1, it should be noted that nitrogen, argon, or most other gases would behave in a similar manner. Thus air could be chosen when a nonreactive material was being deposited by thermal spray or an inert gas when a reactive material was being deposited and the same benefits of extended standoff achieved. It should also be noted that pipes or nozzles with circular cross sections need not be used. Rectangular "slots" in an orifice or nozzle plate of various dimensions were used in Example 1, but nozzles of these or other shapes can be used in the gas shield assemblies on thermal spray devices. While the approach of using preheated air or other gases may be suitable for some applications, it is desirable to use gases of a higher temperature and a more readily useable source of heat.

A gas shield employing the combustion of a gas mixture to create a ring of flames and combustion products (hereinafter called a flame shield) as a high viscosity gas will satisfy the need for higher viscosity gases and the need for a very easily employed source of heat. It is readily adapted to a thermal spray device by providing a fixture with suitable nozzles in an annular array around the periphery of the thermal spray effluent and a controllable source of fuel and oxidant. The nozzles can be slots of various configurations including circular holes in an orifice plate. Preferably, the slots should have a straight section immediately preceding the exit. A variety of fuels can be used including, but not limited to, acetylene, propane, methylacetylene, and propylene, with the unsaturated hydrocarbons having some advantages. A variety of oxidants can be used including, but not limited to, oxygen and air. The fuel and oxidant gases may be mixed prior to flowing through the nozzles or flow through separate nozzles. A variety of flame ignition methods may be used.

Embodiments of the invention are described in detail in Example 2. Using two flame shields with arrays of equally spaced circular holes in a single ring with a diameter of 1.2 inches around a thermal spray nozzle with a diameter of 0.125 inches, one array having 24 holes of 0.031 inch in diameter and the other array having 45 holes of 0.016 inch diameter, it was shown that the length of the laminar flow of the flames was up to about 5 inches long followed by about 7 to 9 inches of turbulent flow. These represent very significant extensions of the laminar flow region demonstrated with preheated gas as described above and in Example 1. While the determination of the optimum operating parameters for the 24 and 45 hole flame ring shields using oxygen and propylene is shown in Example 2, it is obvious that other nozzle shapes, nozzle distribution patterns, and operating parameters may be used within the scope of this invention.

To provide guidelines for the extension of this invention to other thermal spray devices including plasma spray torches (for example with plasma nozzle exit diameters that typically range up to 0.25 inches or larger), the ratios of the thermal energy and gas flows of the flame shield to the plasma effluent were determined for the Praxair plasma spray torch used in the experiments and for other typical plasma spray torches as described in detail in Example 1. Based on these determinations and assuming the optimum flame is independent of the plasma torch effluent flow, the total flame gas flow is controlling and for constant flame gas flows the power ratio will range from about 0.5 to about 5.0 for different torch and flame lengths. If the optimum flame flow must be scaled to the plasma torch effluent flow, then the cold gas flow ratio is controlling. As used herein, the cold flow rate is defined as the sum of the fuel gas flow rate and the oxidizing gas flow rate prior to combustion. Different torches have optimum effluents at different total effluent gas flows. These can change even for a given torch when different classes of powders are being sprayed; e.g., zirconia and NiCoCrAlY typically require different effluent flows. Cold gas flow ratio ranges from about 0.1 to 0.7 for propylene plus oxygen flames. Other fuel gases such as acetylene or propane may require more flow to provide the same heating, since they have a lower heat of combustion. Therefore a wider cold gas flow ratio would be more inclusive of these gas flames, about 0.1 to about 1.2. The carbon to oxygen ratio of the total shield gas flow should be in the range of 0.6 to 1.0, preferably 0.7 to 0.9, and most preferably 0.75 to 0.85. These ranges should be considered only as guidelines and not as limitations on the invention in any manner.

The utility of the invention of the flame shield was demonstrated by plasma spraying zirconium oxide. A comparison was made of coatings produced using a plasma spray torch with the 24-hole flame ring described in Example 2 with those made using the same plasma spray torch with an ambient temperature inert gas shield. A designed experiment was carried out in which thermal barrier coatings with a CoNiCrAlY undercoat and zirconia topcoat were deposited under various conditions and evaluated for microstructural characteristics and thermal shock resistance. This experiment is described in detail in Example 3. It was found that the coatings produced with a flame shielded torch could be deposited at a very substantially greater standoff, had a much more consistent microstructure, were far less sensitive to angle of deposition, and had better thermal shock resistance than those deposited using the ambient temperature inert gas shielded torch. For example, the standoff using a specific torch was extended from a range of 1.25 to at most 1.5 inches with an ambient temperature inert gas shield to a range of 4 to greater than 6 inches. This is not to be construed as a limitation, however, and greater or lesser extensions may be achieved with other plasma spray torches or thermal spray devices.

While the experiments in Examples 2 and 3 used a specific plasma spray torch, a specific flame shield, and specific operating parameters for both, it is obvious that the invention can be used with other thermal spray devices, other laminar flow gas shields, other high temperature shield gases, other means of heating the shield gases, other designs of flame shields, other fuels and oxidants for the flame shield, and other operating parameters optimized for both the thermal spray device and the gas shield. It is also obvious that the gas shields of this invention, particularly flame shields and/or laminar flow shields can be used to produce coatings of a wide variety of other ceramic or oxidation resistant materials including other oxides, carbides, and nitrides.

The flame shields can also be used to control the temperature of the substrate being coated. This is particularly advantageous when it is necessary to coat the substrate at an elevated temperature to obtain a required microstructure. This control can be achieved by adjusting the power of the gas shield and/or the total gas flow of the gas shield.

Another embodiment of the invention is a dual coaxial shield that would have an inner coaxial flow of inert gas and surrounding it a coaxial flow of heated gas or flame gas. The heating benefit of the outer gas and the oxide-prevention benefit of the inner inert gas shield would thus be gained.

Although the description of the invention above and the examples relate primarily to plasma spray deposition, the invention applies to most other forms of thermal spray as well including, but not limited to plasma spray, high velocity oxy-fuel and its many variants, and flame spray.

Thermal or plasma spray coatings can comprise a single or multiple layers of one or more oxide compositions or microstructures, one or more outer layers of a metal or metal alloy of one or more compositions, or any combination of the foregoing layers.

The following examples illustrate the invention, but are not to be considered limiting in any manner.

EXAMPLE 1

Standoff with conventional gas shields are limited even with high gas flows. This was believed due, in part, to the turbulent nature of the shield gas flow. A unique gas shield was thus conceived based on laminar flow of the shield gas. In addition, it was conceived that the laminar flow could be achieved by using a gas with a high viscosity, and that the high viscosity could be obtained by heating the gas. To demonstrate the viability of this invention, the surface (i.e., the interface or gas boundary with the surrounding atmosphere) of various types of shield gas flows (its interface or gas boundary with the surrounding atmosphere) were visualized using several methods, including shadow photography and Schlieren interference photography. Briefly, the Schlieren camera has a light source, say on the left side of the apparatus, focused on the zone where the hot gas will be flowing and this zone is focused on a small circular aperture on the right, while this aperture is, in turn, focused on the image plane of a camera on the far right side of the apparatus. The focal lengths of the lenses used were both 21.8 cm, which gave an ample area between the lenses for the hot gas flows without harming the glass optics. When the medium in the central zone is of uniform refractive index, such as still air or even a flowing air jet in a surrounding still air zone (both at the same temperature) the light path is not disturbed and a featureless, blank image is obtained by the camera. If the gas jet is heated to produce a different refractive index than the surrounding medium the light path is refracted out of the forward beam path and does not go through the small aperture, leading to a dark feature at the camera image. A hot, turbulent gas jet would thus be imaged as a distinct jet having a boundary with the surrounding air that is ragged and undulating with distance, and of course, with time. To eliminate the time element and freeze the image of the jet at one instant an EG&G model 549 Microflash strobe light was used for the light source. The time width of the strobe pulse was 1/50,000 of a second. A Linhof 4×5-inch camera with a 49-mm Schneider lens was used. For every test condition, a Polaroid Type 52 film and a Kodak Plus-X negative film were exposed. The negative film was used to make enlargements for laminar flow length measurements and to see the turbulent flow details. The photographs of the hot gas jets were taken with all room lights off.

One hot gas shield design of this invention has a narrow, annular slot that projects a flow of gas surrounding the torch effluent, coaxial to the centerline of the plasma torch, and has a diameter several times the exit diameter of the torch anode. To simplify this design for the interference photograph studies, a series of nozzles with flat rectangular slots of differing widths, all 0.60 inches long were made. Nozzles with different depths of the slots in the direction of flow were included to determine the effect of allowing the flow to stabilize itself in a laminar mode within the slot before exiting. The slot widths were 0.055 and 0.100 inches, and the slot depths along the flow direction were 0.5, 1.0 and 2.0 inches. The gas fed to the test slots was heated air, since air has the same kinematic viscosity—temperature curve as argon, and would be safer experimentally, since the tests were run in the laboratory without ventilation flows that could distort the test flow pattern. The air was heated using a 4000 watt Leister CH-6056 Electric Hot Air Tool connected upstream of the test section. The room temperature inlet airflow to the heater was measured using a Brooks R-8M-127-4 rotometer. The connecting tube between the heater and the test section was insulated to help minimize heat loss. The exit temperature of the heated gas was measured using a subminiature type K thermocouple just at the exit and at 0.1 inch increments downstream of the exit. This temperature information allowed interpolation of the temperature at the break point between laminar and turbulent flows, measured later from the interference photographs. After the exit gas temperature was mapped as a function of distance from the slot, the thermocouple was removed and the flow was allowed to stabilize ten minutes before the interference photographs were taken.

The experiments were done over a range of hot gas exit temperatures and hot gas exit velocities. The hot gas exit temperatures ranged from 220 to 1050° F. The exit velocity was calculated from the measured inlet cold gas flow rate, the hot to cold absolute temperature ratio and the slot dimensions. The Reynolds number was calculated for the slot flow slightly differently than the pipe flow example shown above, using the hydraulic diameter to represent the slot. The hydraulic diameter is 4 times the slot cross-sectional area divided by the inside slot perimeter. The Reynolds number of the flow was calculated at the exit and at the transition point from laminar to turbulent flow. The latter was somewhat higher than the exit value due to the lower gas temperature at the transition point, as measured by the temperature map. For simplicity, the results are given here in terms of the exit Reynolds number only.

Laminar Flow Measurements
Heated Argon Flow from Rectangular Cross Section Nozzle
Data from Schlieren Interference Camera Photos

| Nozzle dimensions* | | Length to flow width ratio | Exit flow cu. ft./hr. | Exit velocity ft./sec. | Transition Point** | | Laminar Length, in. |
|---|---|---|---|---|---|---|---|
| slot width | flow length | | | | Temp. F. | Reynolds No. | |
| 0.055 | 0.5 | 9.1 | 217 | 263 | 603 | 3950 | 0.00 |
| 0.055 | 1.0 | 18.2 | 217 | 263 | 588 | 4055 | 0.08 |
| 0.055 | 1.0 | 18.2 | 202 | 245 | 720 | 3070 | 0.14 |
| 0.10 | 1.0 | 10 | 202 | 135 | 592 | 3515 | 0.07 |
| 0.10 | 1.0 | 10 | 202 | 135 | 889 | 2320 | 0.08 |
| 0.10 | 2.0 | 20 | 202 | 135 | 604 | 3445 | 0.07 |
| 0.10 | 2.0 | 20 | 202 | 135 | 852 | 2120 | 0.11 |

*Inches. All slot heights were 0.6 inches
**Point in external flow where it changes from laminar to turbulent It was found that the hot gas jets could develop a measurable laminar flow length for exit Reynolds numbers less than 5000, and that the laminar length increased as the Reynolds number was decreased below 5000 for a given nozzle length to width ratio. This could be accomplished by using either higher exit gas temperatures or slower exit gas velocities. The laminar flow length at a Reynolds number of 1000 was about 0.2 inches, as extrapolated from the data. It was found that increasing the length of the flow path in the slot helped to stabilize the laminar flow at the exit. The best condition tested had a flow length to slot width ratio of 20, while the flow was not laminar at all with a flow length to slot width ratio of 9, even with a low Reynolds number of 3950. The approach in these experiments was limited by the heating ability of the in-line gas heater and heat loss effects. Although a long laminar zone was not achieved in these experiments, the results showed that the hot gas shielding concept for laminar flow was effective and that if higher gas temperatures and/or lower gas velocities were used the laminar zone would increase in length.

EXAMPLE 2

The work with hot argon or air as the viscous medium for improving shielding indicated that even higher gas temperatures and lower velocities were desirable, as well as a simpler method of providing such a hot viscous gas flow. A shield gas flow composed of a burning flame and combustion products was conceived to satisfy these needs. The initial design was for an attachable shield device for the Praxair model 1108 plasma spray torch. It comprised an annular chamber with an exit ring having 24 holes 0.031 inches in diameter drilled on an annular circle 1.2 inches in diameter. The length or depth of the holes was 0.079 inches for a flow length to diameter ratio of 2.6. The exit of the holes was in the plane of the face of the torch with the axis of the holes parallel to the axis of the torch and the center of the annular circle on the axis of the torch. The initial gases used were propylene and oxygen, which were mixed in a standard "oxy-acetylene" gas welding handle before entering the shield body. The propylene and oxygen flows were controlled by rotometers on the inlet lines to the welding handle. The gas mixture was ignited as it exited the nozzles forming a shield of combustion flame and combustion products substantially surrounding and flowing coaxially with the plasma effluent. The cylindrical shield of combustion flame and combustion products had a diameter of about 1.5 inches with a "wall" thickness of about 0.125 inches.

A wide range of propylene and oxygen flows was run and the conditions of the flame were plotted against the flow rates of the two gases on an X-Y plot. The low oxygen, high propylene bright yellow flame and the high oxygen, low propylene "chaotic sputter" flame regimes were found, and the trends for laminar flow flame lengths indicated. The flame characteristics in terms of laminar flow flame length and the temperature of the flame at a fixed distance from the torch body, chosen for convenience to be 13 inches, were then determined. The temperatures were measured with a type K thermocouple on the flow path centerline. The laminar length and flame length were measured directly with a ruler.

Figure 2:
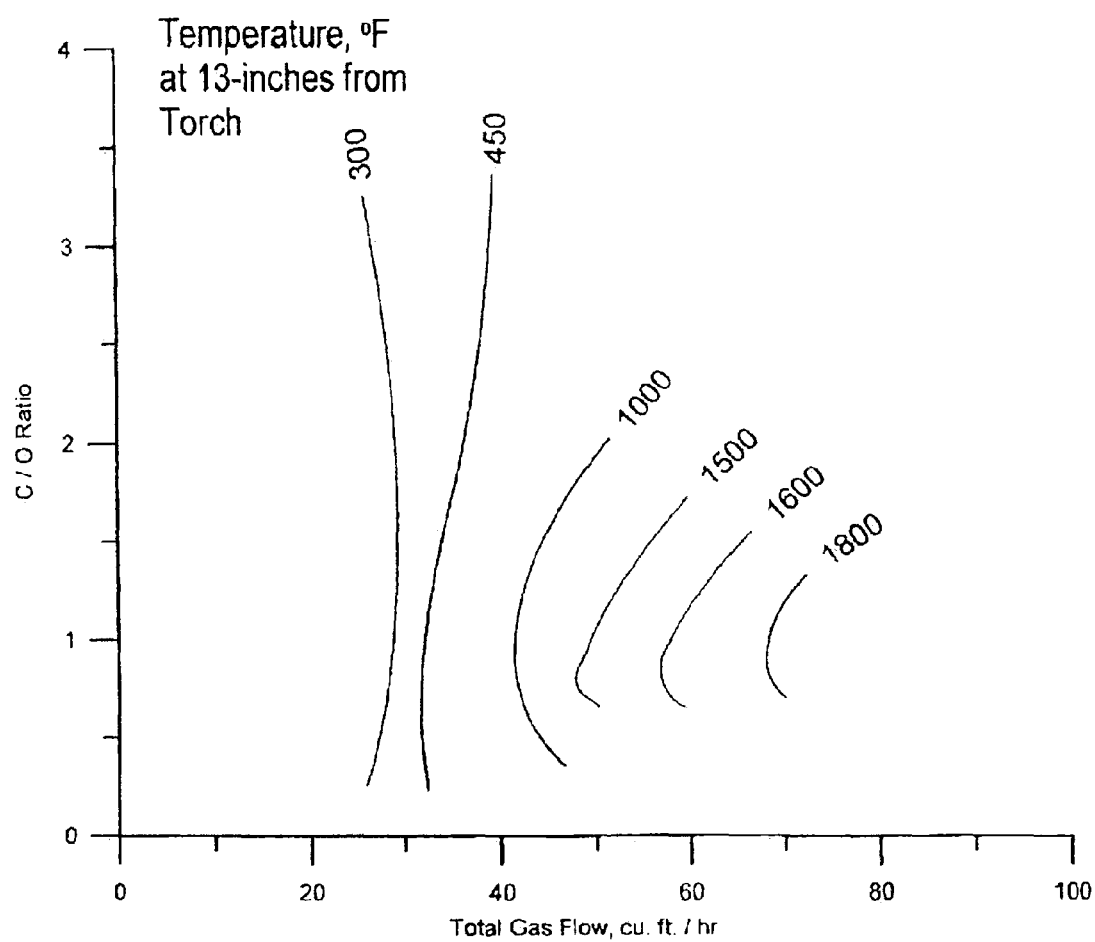
FIG. 2 is a plot of iso-temperature curves as a function of total gas flow (propylene+oxygen) and the oxygen to carbon ratio of the gas mixture (O/C ratio) for a 24-hole demonstration flame ring of this invention.

The results are shown in the contour plots of FIGS. 1 and 2. The value plotted on the ordinate axis is the carbon to oxygen ratio for the gas mixtures, taken to be the ratio of the propylene to oxygen flows in cfh (cubic feet per hour) multiplied by 3/2, since there are three carbon atoms per propylene molecule and two oxygen atoms per oxygen molecule. The value plotted on the abscissa axis is the total gas flow, adding together the cfh values for each propylene and oxygen setting. It was found that the transition from a blue to yellow flame occurred at a C/O ratio of about 0.85. The longest laminar flame lengths were obtained in the blue flame region at about 0.80 C/O and a total gas flow of about 50 cfh. The total flame length including the downstream turbulent region was 16 inches long. The flame temperature, even at a 13-inch standoff is very high and was found to increase with total gas flow, cresting at the 0.8 C/O ratio line. All of these flame characteristics were measured with the plasma torch itself not in operation; otherwise the much brighter plasma arc would not allow visualization of the shield flame. It is likely that with both the torch and flame shield in operation the flame characteristics of the shield would change in terms of length of laminar and total flow.

Figure 3:
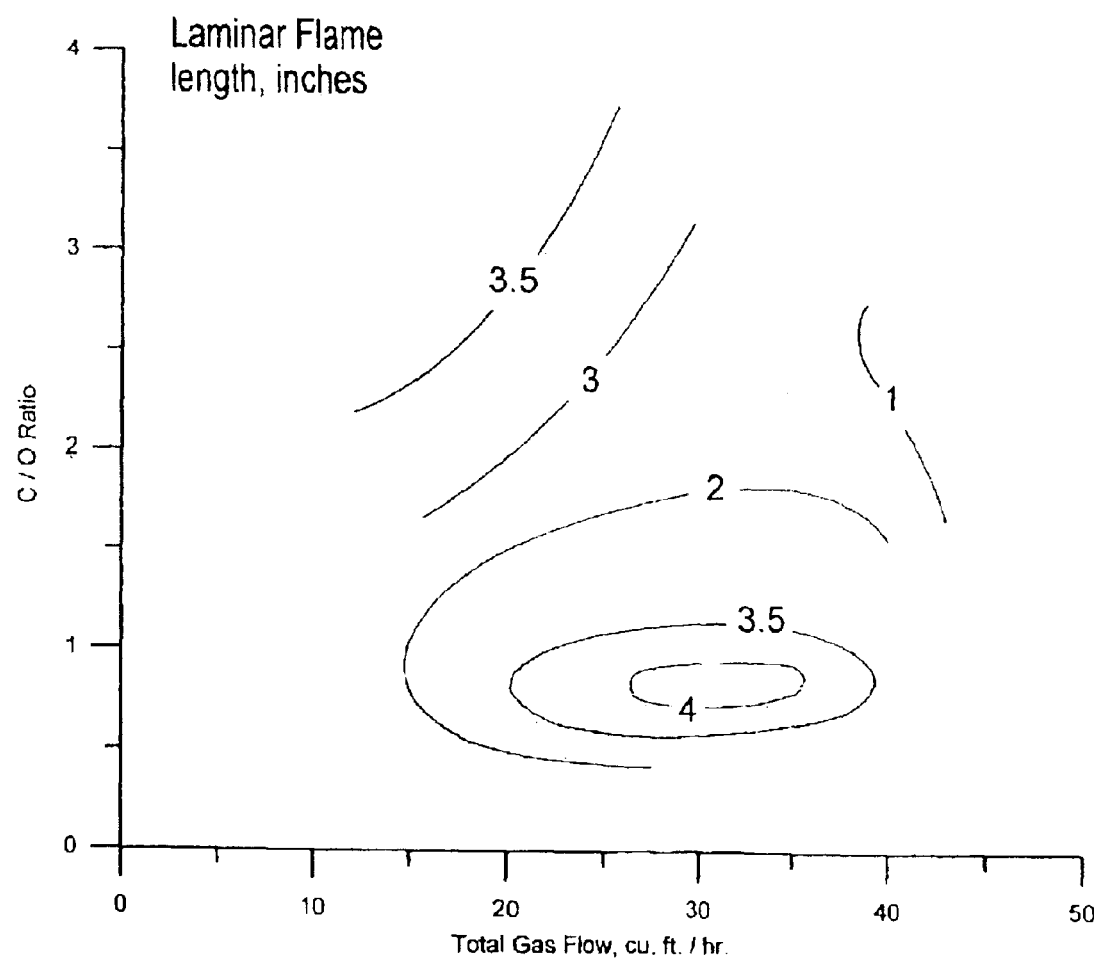
FIG. 3 is plot of laminar flame length of the flame as a function of total gas flow (propylene+oxygen) and the oxygen to carbon ratio of the gas mixture (O/C ratio) for a 45-hole demonstration flame ring of this invention.
Figure 4:
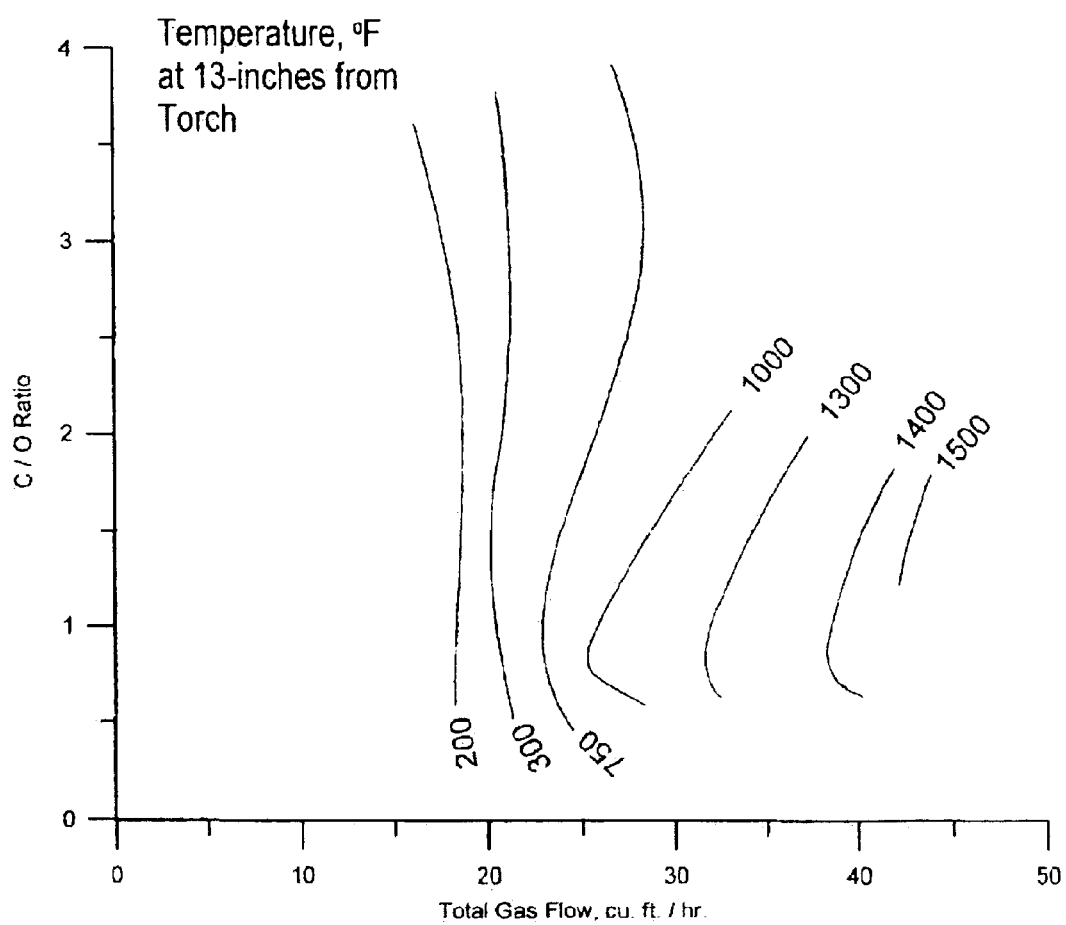
FIG. 4 is a plot of iso-temperature curves as a function of total gas flow (propylene+oxygen) and the oxygen to carbon ratio of the gas mixture (O/C ratio) for a 45-hole demonstration flame ring of this invention.

A similar flame ring for the shield body attachment was then designed, but with 45 holes around the same 1.2 inches annular diameter, each hole 0.016 inches in diameter. The length or depth of the holes was 0.079 inches for a flow length to diameter ratio of 4.9. The total flow area of the 45-hole ring was half of the 24-hole. The same flow mapping of the flame was carried out. The resulting plots are shown in FIGS. 3 and 4. The optimum settings for the longest laminar flame were again at about 0.8 C/O ratio, but now at about 30 cfh total shield gas flow. A similar maximum laminar flame length of 4.5 inches was obtained, but the total flame length was only 14 inches, and the 13 inch standoff temperatures were somewhat lower for the 45-hole flame ring. Both rings were judged to be excellent for the intended purpose.

The cold gas velocity and thermal energy or flame power for several sets of total gas flows, all with a 0.8 C/O ratio, were calculated. The ratio of the flame power to average power of the plasma spray torch used to produce typical zirconia coatings was calculated as well as the gas flow ratios for both the Praxair plasma spray torch and other typical plasma spray torches. The power ratio is defined as the heating rate of the flame calculated in BTU/hr and then converted to kilowatts divided by the power of the plasma torch in kilowatts. The cold gas flow ratio is defined as the cold gas flow of the fuel gas plus the oxidant gas divided by the total gas flow into the plasma spray torch effluent. The results are shown in Table 1. It is evident that the two flame ring designs described above have somewhat different power ratios for the same plasma spray torch conditions. Both produce long laminar flames, but with somewhat different shield gas flows. By extension, other flame ring designs may produce an optimum flame at different shield gas flows as well; however, it is believed that the power ratios should be between 1.0 and 4.0. Nonetheless, the power ratios are given for guidance and are not to be considered as limiting.

For guidance in the design of the flame ring nozzles and operating parameters if the optimum flame is independent of the plasma torch effluent flow, then the total flame gas flow is controlling. For constant flame gas flows, the power ratio will range from about 0.5 to about 5.0 for different torch and flame lengths. If the optimum flame flow must be scaled to the plasma torch effluent flow, then the cold gas flow ratio is controlling. Different torches have optimum effluents at different total effluent gas flows. These can change even for given torch when different classes of powders are being sprayed; e.g., zirconia and NiCoCrAlY typically require different effluent flows. From the table above the cold gas flow ratio ranges from about 0.1 to 0.7 for propylene plus oxygen flames. Other fuel gases such as acetylene or propane may require more flow to provide the same heating, since they have a lower heat of combustion. Therefore a wider cold gas flow ratio would be more inclusive of these gas flames, about 0.1 to about 1.2. The results are shown in the table "Calculated Power of Combustible Gas for Optimum Torch Attachment Design".

TABLE 1

Calculated Power of Combustible Gas for Optimum Torch Attachment Design
Propylene + oxygen Heat of combustion, BTU/ft³ 2740

| Condition | Flows at 0.8 C/O ratio Fuel | Flows at 0.8 C/O ratio Oxygen | Total flow cfh | Flame power BTU/hr. | Flame power KW | Plasma KW PST 1108 | Plasma KW Other Torch | Power ratio: flame to plasma PST | Power ratio: flame to plasma Other torches | Gas ratio: flame to plasma PST 1108 | Equivalent flame flow Other torches |
|---|---|---|---|---|---|---|---|---|---|---|---|
| 24-hole shield ring (hole diameter .031 inches) | | | | | | | | | | | |
| Lower flow for 4" laminar | 10.4 | 19.6 | 74100 | | 21.7 | 14.2 | 40 | 1.63 | 0.54 | 0.14 | 14 |
| Maximum laminar length | 17.4 | 32.6 | 123900 | | 36.2 | 14.2 | 40 | 2.65 | 0.90 | 0.23 | 23 |
| Higher flow for 4" laminar | 23.0 | 43.0 | 163620 | | 47.8 | 14.2 | 40 | 3.38 | 1.19 | 0.30 | 30 |
| Flow area, total all holes, ft² | | | 0.0001258 | | | | | | | | |
| Flow per hole, cfh (at max laminar length) | | | 2.08 | | | | | | | | |
| 45-hole shield ring (hole diameter .016 inches) | | | | | | | | | | | |
| Lower flow for 3.5" laminar | 7.0 | 13.0 | 20 | 49400 | 14.5 | 14.2 | 40 | 1.02 | 0.38 | 0.09 | 9 |
| Maximum laminar length | 10.4 | 19.6 | 30 | 74100 | 21.7 | 14.2 | 40 | 1.53 | 0.54 | 0.14 | 14 |
| Higher flow for 3.5" laminar | 13.9 | 26.1 | 40 | 98800 | 28.9 | 14.2 | 40 | 2.04 | 0.72 | 0.18 | 18 |
| Flow area, total all holes, ft² | | | 0.00006285 | | | | units: KW per KW | | units: cfh per cfh (cold gas flows) | | units: cold gas total cfh |
| Flow per hole, cfh (at max. laminar length) | | | 0.67 | | | | | | | | |

Equations and constants used

Flame power, BTU/hr. = total flow, cfh × heat of combustion, BTU/ft³
Flame power, KW = BTU/hr. × 0.293/1000 where 0.293 × BTU/hr. = watts
Average or typical KW for ZrO2 coating, PST torch        14.2
Average or typical KW for ZrO2 coating, F4, 9 MB, SG100 torches        40
Total gas flow for plasma torch, PST 1108, ZrO2 coating, cfh        220
Total gas flow for plasma torch, F4, 9 MB, SG100, ZrO2 coating, cfh        100

EXAMPLE 3

A comparison was made of zirconia coatings produced using the 24-hole flame ring attached to the Praxair model 1108 plasma torch described in Example 2 with coatings produced using the same torch with an ambient temperature inert gas shield and standard gas flows. The flame ring was operated using 17.5 cfh propylene and 39 cfh oxygen flows with a carbon to oxygen ratio of 0.67. The powder was a yttria-stabilized zirconia. The same powder lot, powder feed rate, torch body and coating cubicle were used throughout.

A designed experiment was carried out that varied four factors over three levels each: torch current, standoff from torch to substrate, surface speed of the substrate and spray angle. The designed experiment required 13 separate experimental lines or coatings to be made. The baseline coating parameters, which formed the center point of the design, were for a vertically segmented coating. The key feature of this coating is its vertical, essentially through-thickness, segmentation cracks, which give it outstanding thermal shock resistance. The spray process with the ambient temperature gas shield is run at relatively close standoff and is sensitive to all four factors noted above to obtain the desired crack density. From earlier testing, a minimum of 20 cracks per inch (CPI) measured along a line parallel to the interface on the polished cross section is desired for good thermal shock performance.

The coatings were applied to one face of one-inch diameter, ⅛-inch thick MarM-509 alloy button substrates with a 0.006 to 0.008 inch thick CoNiCrAlY bondcoat applied first by a separate torch using an ambient temperature inert gas shield. A zirconia coating was applied. The first evaluation of the designed experiment was to examine the polished cross sections of the buttons and count all of the vertical cracks that were at least half the zirconia thickness in length. There are also some shorter microcracks in a zirconia coating, which have a minor effect on thermal shock resistance compared to the long segmentation cracks. These were not counted in this study. The width of the coating evaluated was about 0.8 inches. After evaluating the first plane of polish, all of the samples were repolished to a second plane and evaluated again. The average CPI was used in the regression analysis. All the coatings in the experiment were very close to the same ceramic thickness, about 0.030 inches. With the measured crack counts and the known values of the controlled variables from the experimental design, a multiple correlation regression analysis of the data was done. The result was an equation that gives the cracks per inch as a function of the four factors. Even without the regression analysis by computer, a cursory examination of the CPI results showed the ambient temperature gas torch had a wide range for the 13 coatings, from zero to 70 CPI. There were few cracks when the spray angle was low or the standoff was long. The flame torch coatings had a much narrower range of CPI, all well above the minimum for good thermal shock resistance, and appeared to be less sensitive to angle and standoff. The equations for the two torch setups are as follows.

Standard torch with cold gas shield:

$$CPI = 81.1 + 0.82 \times ANGLE - 72.1 \times SOFB - 0.030 \times SS + 0.285 \times AMPS$$

Flame torch, 24-hole ring shield:

$$CPI = 83.2 + 0.19 \times ANGLE - 21.4 \times SOFB - 0.006 \times SS + 0.046 \times AMPS$$

where ANGLE is the spray angle in degrees (normal to the surface is 90 degrees), SOFB is the standoff distance in inches measured from the Praxair model 1108 torch body to the substrate, SS is the surface speed of the substrate in inches per minute, and AMPS is the torch current. The computer regression analysis confirms with numerical values the trend observed in the cursory examination. The flame torch allows the desired CPI to be obtained with much less sensitivity to all four factors. It is nearly insensitive to the coating angle, within the range examined, which was a major factor with the standard torch. In each similar term of the above equations, the coefficient for the factors is much less for the flame torch. This is a very useful finding in favor of the flame torch; it allows the coating process for this particular coating to have a wider "process window". That is, the coating setup in terms of spray angle, standoff and surface speed are much more forgiving and coating complex-shaped parts should be easier in terms of obtaining the desired cracked structure. Using the method of this invention, zirconia coatings can be produced with about 20 and about 200 vertical segmentations CPI, preferably between about 30 and about 70 CPI. Preferably the zirconia coating should have a porosity of between about 5% and about 40%.

The substrate temperatures for all coatings made in this series, both for the standard torch and the flame torch, were measured. These temperatures were obtained using a contact pyrometer touching the face of the coating immediately after coating. The average button temperature for the standard torch coatings was 440° F. (standard deviation 22.6° F.). For the flame torch the corresponding average temperature was 1125° F. (standard deviation 49.5° F.).

At the same time that the samples were made for the CPI evaluation, thermal shock samples were coated. Four one-inch diameter buttons with the same heat-treated CoNi-CrAlY bondcoat were coated at once for each line. The ceramic layers of all samples were essentially the same thickness of about 0.030 inches (0.0321 inches for the standard torch and 0.0312 inches for the flame torch, both averaged over the 13-line set of samples). One button was sectioned for the CPI evaluation, discussed above. Three buttons were evaluated in a thermal shock test. In this test, each button was held in a loose fixture with little edge contact. The fixtures were held in a wheel that sequentially presented the thermal barrier samples to a flame heating station, an air-blast cooling station and then two ambient cooling stations. This heating-cooling cycle was repeated 2000 times. The thermal shock rig dwelled at each station for 20 seconds. The ceramic layer faced the flame and was heated to 2330° F. by the end of the heating period and was cooled to about 600° F. by the end of the final cooling period. Prior to the test the edges of the buttons were ground to present the coating layers squarely with no edge radius. At this point any horizontal edge cracks indicating separation were noted by measurement at a magnification of 30×. After the test the edge cracks were measured again, and any growth was attributed to the thermal shock test. All samples of both test matrices had essentially zero pre-test edge cracks. The thermal barrier coating was considered to have failed the test if more than 15% of the circumference had separation cracks. In this comparison, both sets of samples were quite good, but the flame torch samples were better. The ambient temperature shield gas torch samples had an average edge crack value of 2.8% for all 13 coatings, with the worst sample being 13.3% edge cracked. The same experimental conditions with the flame torch gave a 0.8% average and a worst case of 2.3%. Thus the flame torch produced coatings over a range of processing conditions that were much more thermal shock resistant than the standard torch, especially where the process conditions were extreme, such as long standoff or poor coating angle.

While the experimental data showing the improvements of the high viscosity gas shields for thermal spray coating were carried out using a Praxair model 1108 plasma torch, the invention is not limited to that thermal spray device. Similarly, the invention is not limited to the particular design of the gas shield that was used. It is obvious that the operating parameters of the thermal spray device and the shield would change with the specific design of each. In addition, while the coating experiments were carried out with a specific ceramic material, it is obvious that the invention would encompass any ceramic or oxidation resistant material.

The present example has clearly shown the usefulness of the flame shield attachment to a plasma torch by improving the coating of zirconium oxide samples shown by subsequent thermal shock testing. Without being bound by theory, the exact mechanism by which the flame shield has improved the coating is not known. The data showed the flame raised the temperature of the substrate being coated, and in Example 2 the data showed the flame greatly raised the coaxial gas temperature downstream of the torch and created a visible laminar flow length of several inches. These latter results are shown in FIGS. 1 to 4. However, the data for the Figures was taken with the torch effluent off, and with the torch on, the arc was too bright to see the flame, and thus was likely that the flame characteristics might change with the torch on. It is possible that with the torch on, the flame shield would still have some laminar flow length and possible that in addition to keeping the effluent hotter to longer distances, and heating the substrate, that this laminar flow zone is somehow responsible for the coating improvement.

A dual coaxial shield that would have an inner coaxial flow of inert gas and surrounding it with a coaxial flow of laminar gases and/or combustible gases benefits from its standoff extension feature and its oxide-prevention feature.

Other variations of the disclosed methods are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A method of shielding the effluent of a thermal spray device comprising the heating of an annular source of shield gas to a temperature above ambient and said shield gas flow being substantially surrounding said effluent in an coaxial manner and the annular source for said shield gas is in a plane normal to said effluent thereby providing said gas flow parallel to the effluent, wherein the temperature of said shield gas is at least 500° F., measured on the centerline of the flow conic at 13 inches downstream from the source of said shield flow, and wherein said shield gas is a flow having at least a laminar segment from the source of said effluent flow.

2. The method of claim 1 wherein the shield gas is a combustible gas comprising a combustion flame and combustion products.

3. The method of claim 1 wherein said effluent comprises an oxide material.

4. The method of claim 3 wherein said oxide is zirconia or a compound containing zirconia.

5. The method of claim 1 wherein said effluent is deposited onto a substrate to form a coating layer.

6. The method of claim 5 wherein the coated layer has between about 20 and about 200 vertical segmentation cracks per inch.

7. The method of claim 5 wherein a first layer of the first effluent is deposited utilizing a first set of shield gas conditions, and repeating this method at least once with the same or different effluent utilizing the same or a different set of shield gas conditions to obtain multiple coating layers.

8. The method of claim 7 wherein at least one of the coated layers has between about 20 and about 200 vertical segmentation cracks per inch.

9. The method of claim 5 wherein the temperature of the substrate is controlled by adjusting the total gas flow of said shield gas.

10. The method of claim 9 wherein the ratio of the total gas flow of said gas shield to the total gas flow of said thermal spray torch is between about 0.05 to about 2.0.

11. The method of claim 5 wherein the temperature of the substrate is controlled by adjusting the power of said shield gas.

12. The method of claim 11 wherein the ratio of the power of said gas shield to the power of said thermal spray effluent is in the range of between about 0.5 to about 5.0.

13. The method of claim 5 wherein said substrate is selected from the group consisting of gas turbine, diesel engine, and rocket engine components.

14. The method of claim 1 wherein said annular source comprising a first inner coaxial section for the flow of a first gas substantially surrounding said effluent and a second coaxial outer section for the flow of second gas surrounding said inner flow of said first gas and said second flow is heated to a temperature above ambient and the annular sources for said shield gases are in a plane normal to said effluent thereby providing said gas flows parallel to the effluent.

15. The method of claim 14 wherein the temperature of said dual shield gas is at least 500° F., measured on the centerline of the flow conic at 13 inches downstream from the source of said shield flows.

16. The method of claim 14 wherein the first gas is an inert gas.

17. The method of claim 14 wherein the second gas is a combustible gas comprising a combustion flame and combustion products.

18. The method of claim 14 wherein said effluent is a reactive material.

19. The method of claim 14 wherein said effluent is deposited onto a substrate to form a coating layer.

20. The method of claim 19 wherein a first layer of a first effluent is deposited utilizing a first set of shield gas conditions, and repeating this method at least once with the same or different effluent utilizing the same or a different set of shield gas conditions to obtain multiple coating layers.

21. The method of claim 20 wherein said first layer is a metallic coated layer and said subsequent layers are ceramic coated layers or mixed metal-ceramic coated layers.

22. The method of claim 21 wherein said layers are selected from the group consisting of zirconia, yttria, hafnia, alumina, chromia, NiCrAlY, CoCrAlY, NiCoCrAlY, CoNiCrAlY, zirconium-based ceramics, ceramics and mixtures thereof.

23. The method of claim 21 wherein at least one coated layer has between about 20 and about 200 vertical segmentation cracks per inch.

24. The method of claim 19 wherein the temperature of the substrate is controlled by adjusting the total gas flow of said shield gas.

25. The method of claim 24 wherein the ratio of the total gas flow of said gas shield to the total gas flow of said thermal spray torch is between about 0.05 to about 2.0.

26. The method of claim 19 wherein the temperature of the substitute is controlled by adjusting the power of said shield gas.

27. The method of claim 26 wherein the ratio of the power of said gas shield to the power of said thermal spray effluent is in the range of between about 0.5 to about 5.0.

28. The method of claim 19 wherein said substrate is selected from the group consisting of gas turbine, diesel engine, and rocket engine components.

29. The method of claim 14 wherein said heated shield gas comprising a combustible gas material of a carbon-containing gas and an oxidant in which the carbon to oxygen ratio of said shield gas is between about 0.6 to about 1.0.

30. The method of claim 1 wherein said heated shield gas comprising a combustible gas material of carbon-containing gas and an oxidant in which the carbon to oxygen ratio of said shield gas is between about 0.6 to about 1.0.

* * * * *